US009836133B2

(12) United States Patent
Jiang et al.

(10) Patent No.: US 9,836,133 B2
(45) Date of Patent: Dec. 5, 2017

(54) TOUCH PEN

(75) Inventors: Kai-Li Jiang, Beijing (CN);
Shou-Shan Fan, Beijing (CN)

(73) Assignees: Tsinghua University, Beijing (CN);
HON HAI PRECISION INDUSTRY CO., LTD., New Taipei (TW)

( * ) Notice: Subject to any disclaimer, the term of this patent is extended or adjusted under 35 U.S.C. 154(b) by 726 days.

(21) Appl. No.: 13/337,013

(22) Filed: Dec. 23, 2011

(65) Prior Publication Data

US 2012/0162155 A1 Jun. 28, 2012

Related U.S. Application Data

(63) Continuation of application No. 13/326,730, filed on Dec. 15, 2011, now abandoned.

(30) Foreign Application Priority Data

Dec. 27, 2010 (CN) .......................... 201010607312.0
Dec. 27, 2010 (CN) .......................... 201010607313.5
Dec. 27, 2010 (CN) .......................... 201010607323.9
Dec. 27, 2010 (CN) .......................... 201010607325.8
Dec. 27, 2010 (CN) .......................... 201010607421.2
Dec. 27, 2010 (CN) .......................... 201010607442.4
Dec. 27, 2010 (CN) .......................... 201010607458.5

(51) Int. Cl.
*G06F 3/033* (2013.01)
*G06F 3/0354* (2013.01)
*G06F 3/044* (2006.01)

(52) U.S. Cl.
CPC .......... *G06F 3/03545* (2013.01); *G06F 3/044* (2013.01)

(58) Field of Classification Search
CPC ...... G06F 3/03545; G06F 3/044; G06F 3/039; G06F 3/045; H01L 51/444; H01L 51/0048; H01J 2201/30469; C01B 31/0206; C01B 31/022
USPC ..................... 345/156–183; 178/18.01–20.04
See application file for complete search history.

(56) References Cited

U.S. PATENT DOCUMENTS

| 5,488,204 | A | * | 1/1996 | Mead et al. | 178/18.06 |
| 2005/0078096 | A1 | * | 4/2005 | Fan | G06F 3/03545 345/179 |
| 2005/0264542 | A1 | * | 12/2005 | Yueh | 345/179 |
| 2006/0274049 | A1 | * | 12/2006 | Spath et al. | 345/173 |
| 2008/0063860 | A1 | * | 3/2008 | Song et al. | 428/336 |
| 2008/0297493 | A1 | * | 12/2008 | Adkins | 345/179 |

(Continued)

FOREIGN PATENT DOCUMENTS

| CN | 101498967 | 8/2009 |
| CN | 201302702 | 9/2009 |

(Continued)

OTHER PUBLICATIONS

Russian Scientists Won the Nobel Prize for Physics by Graphene research, Electronic Engineering Times, Oct. 7, 2010, http://www.eettaiwan.com/ART_8800622447_480102_NT_714e1f08.HTM.

*Primary Examiner* — Roberto Flores
(74) *Attorney, Agent, or Firm* — ScienBiziP, P.C.

(57) ABSTRACT

A touch pen includes a body and a head fixed on one end of the body and electrically connected with the body. The head includes a supporter and a contact layer. The supporter includes a fixing section and a main section. The contact layer is disposed on an outer surface of the main section. The contact layer includes a graphene layer.

8 Claims, 30 Drawing Sheets

(56) References Cited

U.S. PATENT DOCUMENTS

| | | | |
|---|---|---|---|
| 2009/0085894 A1* | 4/2009 | Gandhi et al. | 345/175 |
| 2009/0102810 A1* | 4/2009 | Jiang et al. | 345/173 |
| 2009/0153502 A1* | 6/2009 | Jiang et al. | 345/173 |
| 2009/0153504 A1* | 6/2009 | Liu et al. | 345/173 |
| 2009/0191367 A1* | 7/2009 | Chen | 428/34.1 |
| 2009/0262637 A1* | 10/2009 | Badaye et al. | 369/126 |
| 2010/0001976 A1* | 1/2010 | Jiang et al. | 345/174 |
| 2010/0019209 A1* | 1/2010 | Meng et al. | 252/511 |
| 2010/0051471 A1* | 3/2010 | Meng et al. | 205/414 |
| 2010/0073322 A1 | 3/2010 | Jiang et al. | |
| 2010/0213790 A1* | 8/2010 | Chen et al. | 310/307 |
| 2010/0221536 A1* | 9/2010 | Yang et al. | 428/367 |
| 2010/0271048 A1* | 10/2010 | Kouno | 324/658 |
| 2011/0242310 A1* | 10/2011 | Beebe et al. | 348/88 |
| 2011/0261026 A1* | 10/2011 | Kim | G06F 3/03545 345/179 |
| 2011/0273376 A1* | 11/2011 | Dickinson et al. | 345/173 |
| 2011/0316815 A1* | 12/2011 | Fang | 345/179 |
| 2012/0086674 A1* | 4/2012 | Kim | G06F 3/03545 345/179 |
| 2013/0038579 A1* | 2/2013 | Boyd et al. | 345/179 |

FOREIGN PATENT DOCUMENTS

| | | |
|---|---|---|
| CN | 201348771 | 11/2009 |
| JP | 5-92842 | 4/1993 |
| JP | 10-39989 | 2/1998 |
| JP | 10-171579 | 6/1998 |
| JP | 2004-244490 | 9/2004 |
| JP | 2009-275225 | 11/2009 |
| JP | 2010-73208 | 4/2010 |
| KR | 10-0984666 | 10/2010 |
| TW | M363637 | 8/2009 |
| WO | WO2007099975 | 9/2007 |

\* cited by examiner

TOUCH PEN

RELATED APPLICATIONS

This application is a continuation application of U.S. patent application Ser. No. 12/326,730, filed on Dec. 15, 2011, entitled "TOUCH PEN," which claims all benefits accruing under 35 U.S.C. §119 from China Patent Application No. 201010607325.8, filed on Dec. 27, 2010; No. 201010607313.5, filed on Dec. 27, 2010; No. 201010607458.5, filed on Dec. 27, 2010; No. 201010607442.4, filed on Dec. 27, 2010; No. 201010607421.2, filed on Dec. 27, 2010; No. 201010607323.9, filed on Dec. 27, 2010; and No. 201010607312.0, filed on Dec. 27, 2010, in the China Intellectual Property Office, the disclosures of which are incorporated herein by reference.

BACKGROUND

1. Field of the Invention

The present disclosure relates to touch pens and particularly, to a touch pen used on touch panels.

2. Discussion of Related Art

Following the recent advancement of various electronic apparatus, such as mobile phones, car navigation systems toward high performance and diversification, there has been a growing number of electronic apparatuses equipped with optically transparent touch panels at the front of their respective display devices (e.g., liquid crystal panels).

Touch pens are good input apparatuses to touch panels. To maintain its portability, the touch pens cannot have large sizes. To obtain good conductivity, the touch pens conventionally have a pen tip made of metals. However, the pen tip made of metals can damage the touch screen of the touch panels.

What is needed, therefore, is to provide a touch panel with soft pen tip.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

Figure 1:
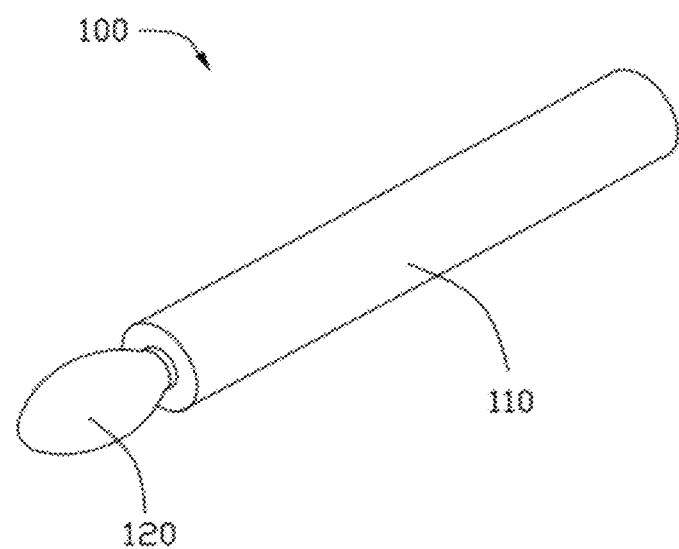
FIG. 1 is a schematic structural view of a touch pen of one embodiment.

Corresponding reference characters indicate corresponding parts throughout the several views. The exemplifications set out herein illustrate at least one embodiment of the present touch panel and display device using the same, in at least one form, and such exemplifications are not to be construed as limiting the scope of the invention in any manner.

DETAILED DESCRIPTION

Reference will now be made to the drawings to describe, in detail, embodiments of the present touch pen.

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Touch Pen

Referring to FIG. 1, a touch pen 100 in one embodiment includes a pen head 120 and a pen body 110. The pen head 120 is fixed on one end of the pen body 110. The pen head 120 is soft and electrically conductive.

The pen body 110 is for users to hold the touch pen 100. The pen body 110 is electrically connected with the pen head 120. The pen body 110 can conduct electrons from users' hand to the pen head 120. When the pen head 120 contacts a touch panel in application, the contact region of the pen head 120 can be detected by the touch panel.

Figure 2:
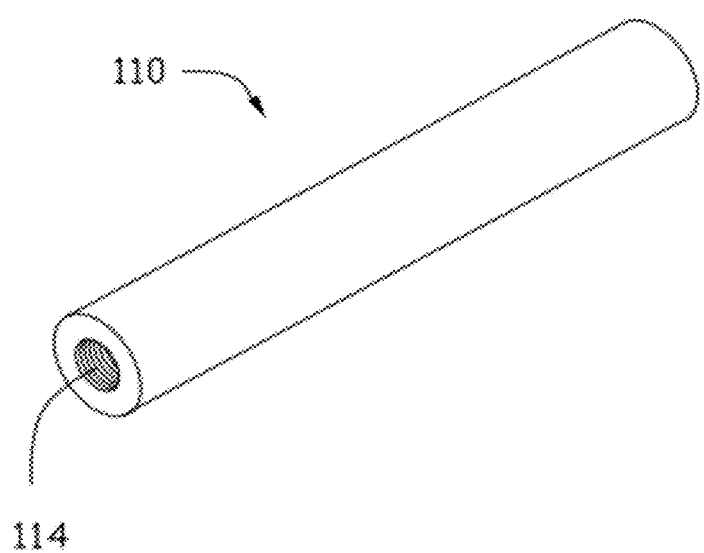
FIG. 2 is a schematic view of a pen body of the touch pen of FIG. 1.

Referring to FIG. 2, the pen body 110 can be, but not limited to, a tubular structure and includes a fixing end 114. The fixing end 114 may have a hole with an internal thread in one embodiment. The pen head 120 can be designed for insertion through the hole of the fixing end 114 and electrically connects the pen body 110. It is understood that, to make the pen body 110 electrically connect with the pen head 120, the connecting means of the pen body 110 and the pen head 120 is not limited to the way described above.

Figure 3:
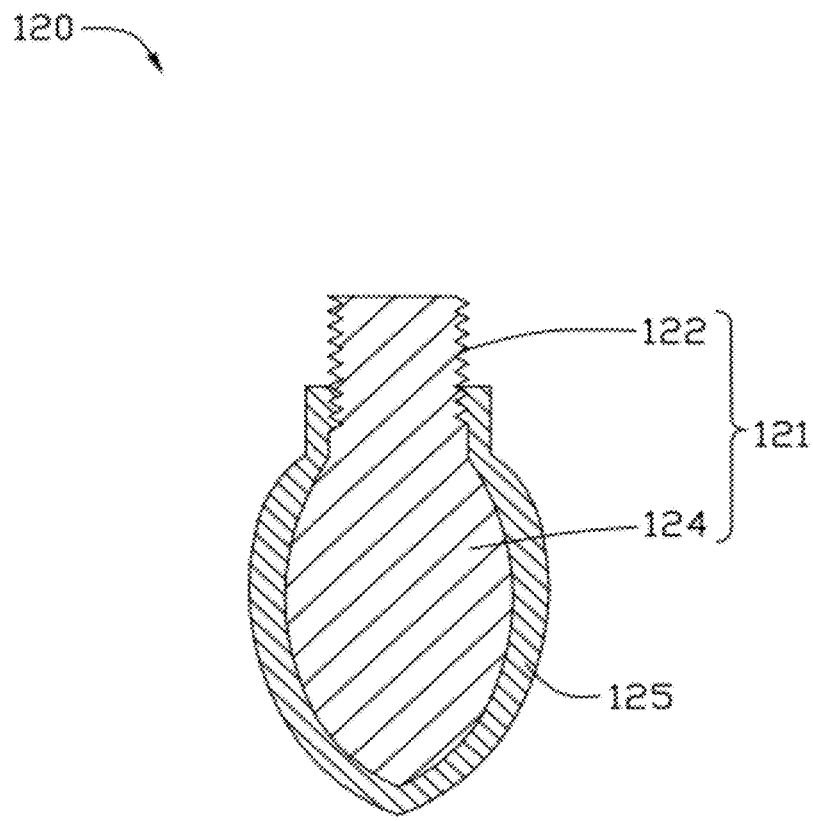
FIG. 3 is a cross-sectional view of one embodiment of a pen head.

Referring to FIG. 3, in one embodiment, the pen head 120 includes a supporter 121 and a contact layer 125. The contact layer 125 is attached on an outer surface of the supporter 121. The supporter 121 can be made of flexible materials, such as polymer. The contact layer 125 can be made of flexible conductive materials. A shape of the pen head 120 can be designed according to actual needs and can be, but not limited, to spherical shape or cone shape. In one embodiment, the pen head 120 has a cone shape. Because the pen head 120 is flexible, a contact area between the contact layer 125 of pen head 120 and the touch panel can be controlled by pressure applied on the pen head 120. To control the width of the line shown on the touch panel when the pen head 120 contacts with and moves on the touch panel, a contact capacitor between the pen head 120 and the touch panel is proportional to the contact area between the pen head 120 and the touch panel. Therefore, the width of the line shown on the touch panel can be controlled by the pressure applied on the pen head 120 when the pen head 120 contacts and moves on the touch panel. The pen head 120 can be used to paint different styles of paintings or handwritings on the touch panel. It is understood that the pen head 120 may have different shapes according to different painting or handwriting styles. The pen head 120 can be in a shape of a Chinese traditional handwriting pen or a brush used in oil painting.

Supporter

In one embodiment, the supporter 121 includes a fixing section 122 and a main section 124. An external thread is defined on an outer surface of the fixing section 122, which corresponds to the preformed internal thread of the fixing end 114 of the pen body 110. The fixing section 122 is used to fasten the pen head 120 to the fixing end 114 of the pen body 110. The shape of the main section 124 can be designed according to actual needs, is not limited. The main section 124 can be spherical shape, cone shape, or any shape according to different painting styles.

Figure 4:
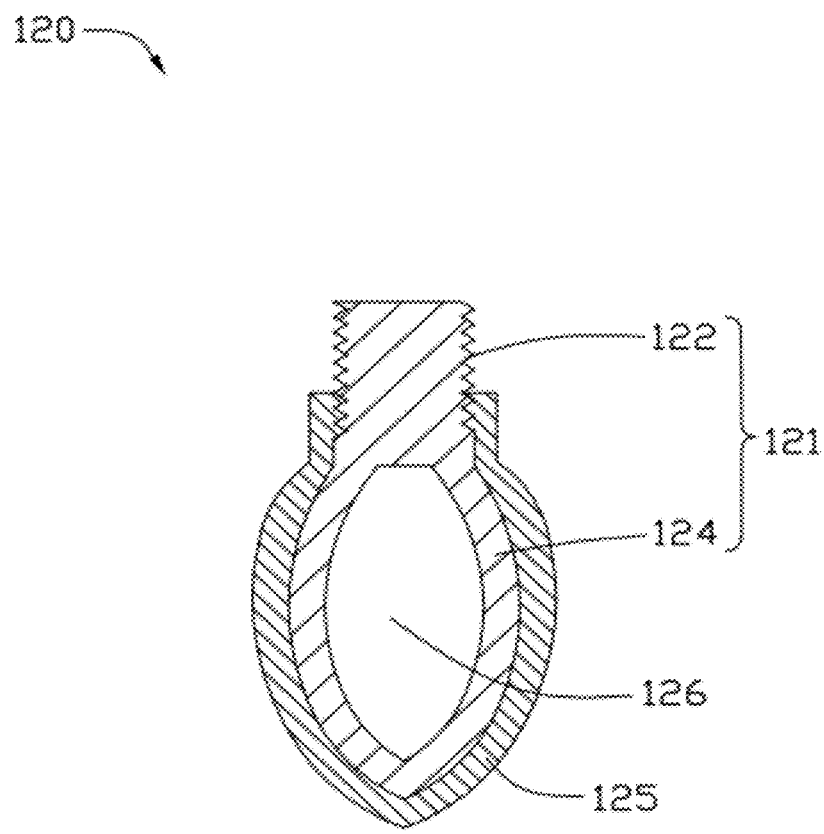
FIG. 4 is a cross-sectional view of another embodiment of a pen head.

Referring to FIG. 4, in one embodiment, the supporter 121 has a hollow structure and defines a space 126 in the main section 124. The main section 124 has a wall with a thickness in a range from about 0.1 millimeters to about 2 millimeters. The supporter 121 with a hollow structure has a good flexibility and is easy to control the contact capacitor between the pen head 120 and the touch panel in application.

The supporter 121 can be made of a flexible polymer material. The flexible polymer material can be silicone elastomer, poly methyl methacrylate, polyurethane, epoxy resin, polypropylene acid ethyl ester, acrylic acid ester, polystyrene, polybutadiene, polyacrylonitrile, polyaniline, polypyrrole, polythiophene and combinations thereof. In one embodiment, the flexible polymer material is silicone elastomer. The supporter 121 can be made of an electrically conductive polymer with a high dielectric constant, to improve the contact capacitor between the pen head 120 and the touch panel in application. The electrically conductive polymer can be polyaniline, polypyrrole, polythiophene, polyacetylene, polyparaphenylene, poly phenylene vinylene, or any combination of them. In one embodiment, the material of the electrically conductive polymer is polyaniline.

Contact Layer

Referring to FIG. 3, in one embodiment, the contact layer 125 covers the entire outer surface of the main section 124 of the supporter 121. The contact layer 125 is located on the main section 124 and covers at least parts of the fixing section 122. The contact layer 125 is made of flexible conductive materials. The contact layer 125 is electrically connected with the pen body 110 when the fixing section 122 is inserted in the hole of the fixing end 114 of the pen body 110, because the contact layer 125 covers at least parts of the fixing section 122.

Figure 5:
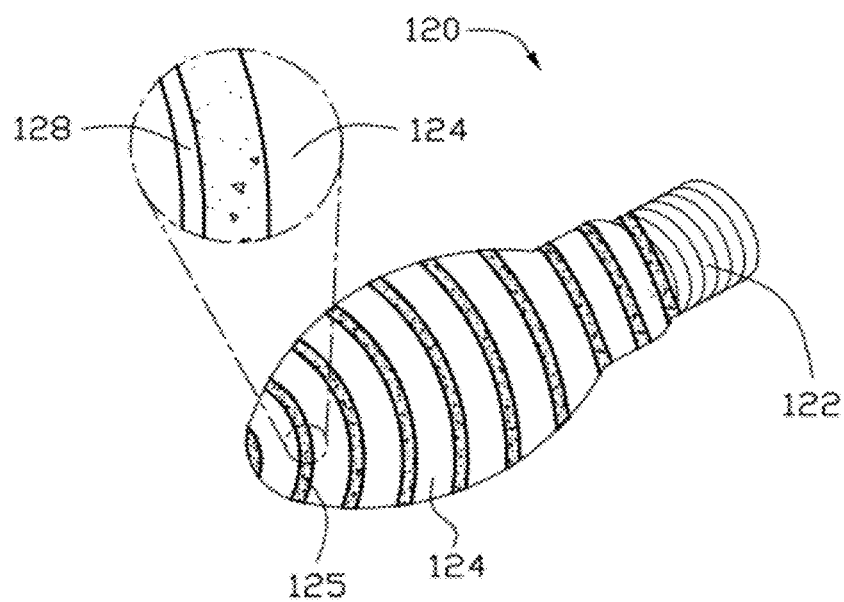
FIG. 5 is essentially a schematic view of another one embodiment of a pen head.

Referring to FIG. 5, in another embodiment, the contact layer 125 is a ribbon-shaped layer located on part of the outer surface of the main section 124 of the pen head 120. The contact layer 125 helically wraps around the main section 124 and extends to the fixing section 122. A radius of the contact layer 125 gradually increases along a direction from a tip of the main section 124 to the middle of the main section 124, and then decreases from the middle of the main section 124 to the fixing section 122. In one embodiment, a groove surrounds the outer surface of the main section 124, and the contact layer 125 is located in the groove. The contact layer 125 has a protrusion 128 extending out of the groove, the protrusion 128 is used to contact the touch panel in application. Compared to covering the whole outer surface of the main section 124, the contact layer 125, in FIG. 5, can cover part of the outer surface of the main section 124, which will be a lower cost.

The contact layer 125 is used to contact the touch panel and form contact capacitor between the contact layer 125 and the touch panel, when the electrons of user's hand conduct to the touch panel by the touch pen 100. The contact capacitor can be detected by the touch panel, and the width of lines detected by the touch panel can be controlled by the contact area between the contact layer 125 and the touch panel. A thickness of the contact layer 125 can be in a range from about 0.1 millimeters to about 2 millimeters.

Figure 6:
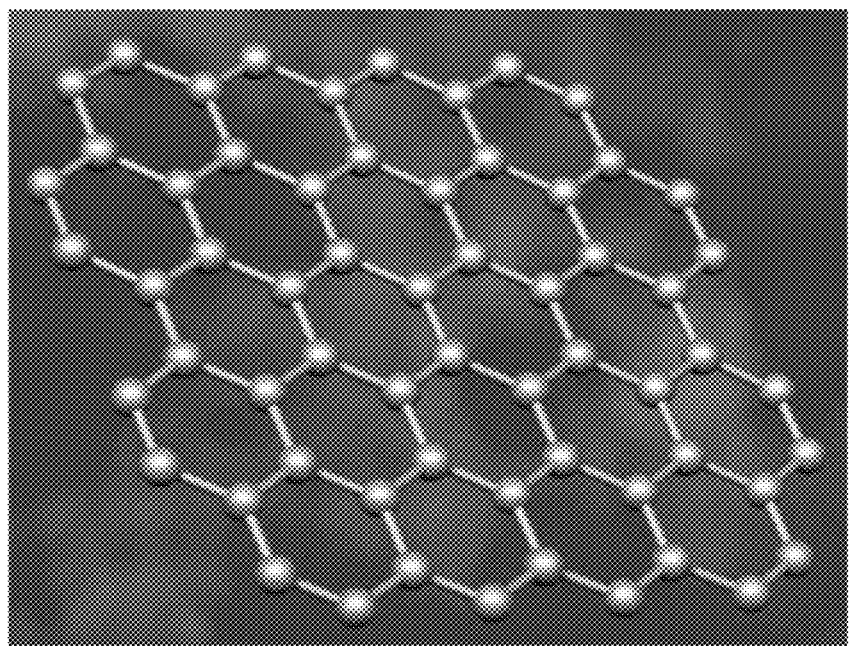
FIG. 6 is a schematic view of a graphene.

In one embodiment, the contact layer 125 is a graphene layer. The graphene layer includes at least one layer of graphene. In one embodiment, the graphene layer is a pure structure of graphenes. Referring to FIG. 6, the graphene is a one-atom-thick planar sheet of $sp^2$-bonded carbon atoms that are densely packed in a honeycomb crystal lattice. A size of the graphene can be very large (e.g., several millimeters). However, the size of the graphene generally made is less than 10 microns (e.g., less than 1 micron). The graphene layer can include a single layer of graphene or a plurality of layers of graphene. If the graphene layer includes a plurality of layers of graphene, the plurality of layers of graphene are stacked with each other or located side by side. The graphene layer can be a continuous integrated structure. The term "continuous integrated structure" can be defined as a structure that is combined by a plurality of chemical bonds (e.g., $sp^2$ bonds, $sp^1$ bonds, or $sp^3$ bonds) to form an overall structure. A thickness of the graphene layer can be less than 100 nanometers. In one embodiment, the thickness of the graphene can be in a range from about 0.5 nanometers to about 100 nanometers. A thickness of the graphene layer can be less than 1 millimeter. Because the graphene is nano-sized material with small size, the graphene layer can be fixed on the outer surface of the supporter 121 via van der Waals attractive force. In other embodiments, the graphene layer can be fixed on the outer surface of the supporter 121 via conducive adhesive. Graphene has large specific surface, and if the graphene layer is used as the conductive layer, a large capacity can be formed between the contact layer 125 and the touch screen, as such, a sensitivity of the contact layer 125 can be improved. Furthermore, the surface of the graphene is very smooth, the contact layer 125 will not damage the touch screen when contact layer 125 contact the touch screen.

Figure 7:
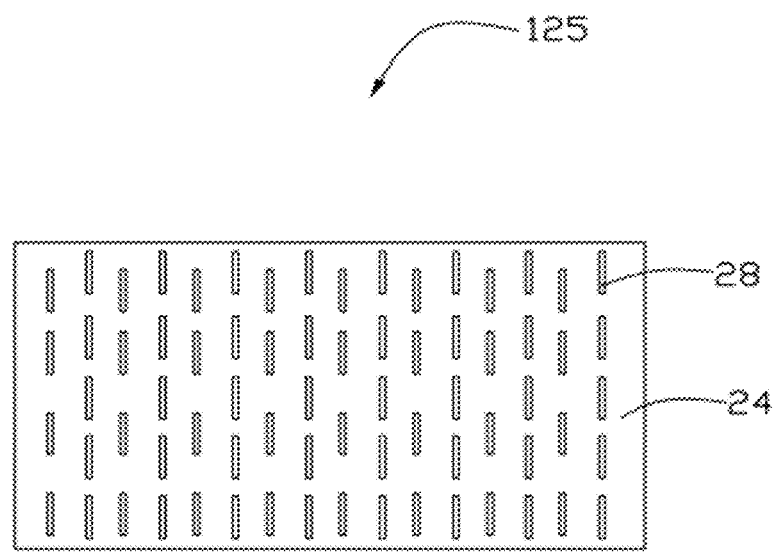
FIG. 7 is a schematic view of a graphene composite material used as a contact layer of the pen head of one embodiment.

Referring to FIG. 7, in one embodiment, the contact layer 125 includes a flexible polymer matrix 24 and a plurality of graphenes 28 dispersed in the flexible polymer matrix 24. Some of the graphenes 28 can protrude from the flexible polymer matrix 24. The plurality of graphenes 28 can contact each other to form a conductive network structure. A weight percentage of the plurality of graphenes 28 is in a range from about 10% to about 60%. A thickness of the graphene 28 is in a range from about 0.5 nanometers to about 100 nanometers.

Figure 8:
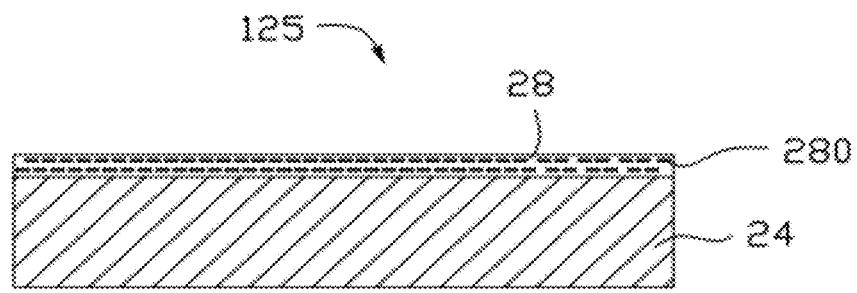
FIG. 8 is another graphene composite material used as a contact layer of the pen head of one embodiment.

Referring to FIG. 8, in one embodiment, the contact layer 125 includes a graphene layer 280 and a flexible polymer matrix 24. The graphene layer 280 is disposed on a surface of the flexible polymer matrix 24. The graphene layer 280 includes a plurality of graphenes 28 stacked with each other.

Figure 9:
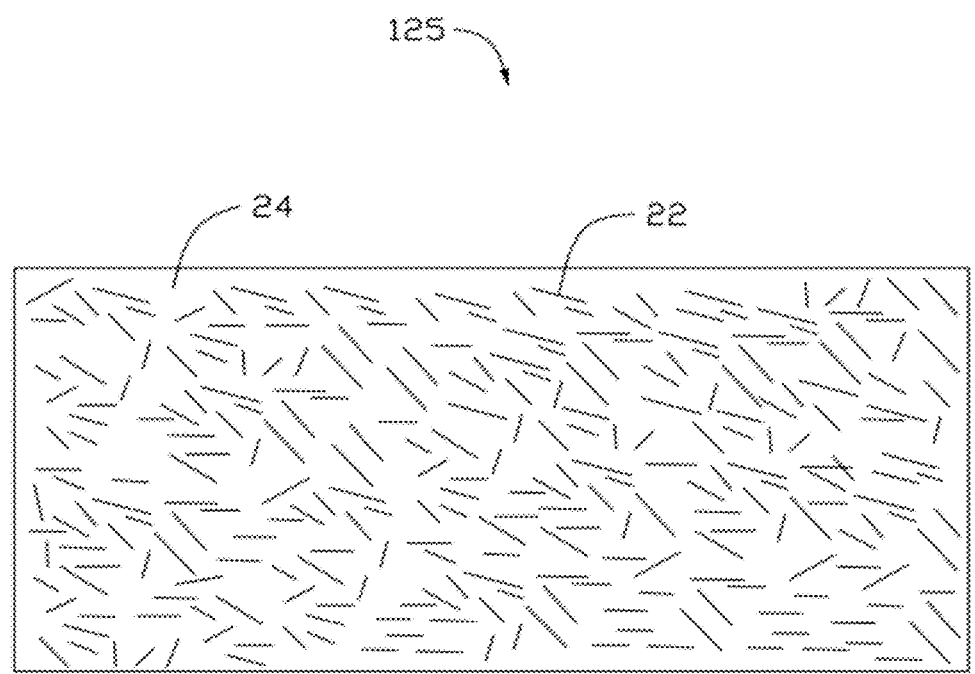
FIG. 9 is a schematic view of a carbon nanotube composite layer used as a contact layer of the pen head of one embodiment.

Referring to FIG. 9, in one embodiment, the contact layer 125 is a carbon nanotube composite layer that includes a flexible polymer matrix 24 and a plurality of carbon nanotubes 22 dispersed therein. The plurality of carbon nanotubes 22 connect each other and cooperatively form a conductive network. To form the conductive network, a weight percentage of the plurality of carbon nanotubes in the contact layer 125 can range from about 5% to about 10%. The plurality of carbon nanotubes 22 has a large specific surface area and high conductivity. The contact layer 125 including the plurality of carbon nanotubes also has large specific surface area, which can increase the contact capacitor between the contact layer 125 and the touch panel on per unit area. Therefore, the pen head 120 would have a good sensitivity. The contact layer 125 would also have a good flexibility and durability because carbon nanotubes are the strongest and stiffest materials yet discovered in terms of tensile strength and elastic modulus respectively. In one embodiment, at least part of the plurality of carbon nanotubes 22 extrudes out of the flexible polymer matrix 24 in the contact layer 125. The at least part of the plurality of carbon nanotubes 22 extruded out of the flexible polymer matrix 24 can directly contact the touch panel in application.

The flexible polymer matrix 24 has a sheet structure with a thickness in a range from about 0.1 micrometers to about 2 millimeters. The flexible polymer matrix 24 can be made of a flexible polymer material such as polydimethylsiloxane, polypropylene, poly ethyl acrylate, poly butyl acrylate, polystyrene, polybutadiene, poly acrylonitrile or combinations thereof. In one embodiment, the flexible polymer matrix 24 is made of polydimethylsiloxane. The flexible polymer matrix 24 can be made of an electrically conductive polymer with a high dielectric constant, to improve the contact capacitor between the contact layer 125 and the touch panel in application. The electrically conductive polymer can be polyaniline, polypyrrole, polythiophene, polyacetylene, polyparaphenylene, poly phenylene vinylene, or any combination of them. In one embodiment, the material of the electrically conductive polymer is polyaniline.

In another embodiment, the contact layer 125 can be a carbon nanotube structure 12. The carbon nanotube structure 12 includes a plurality of carbon nanotubes joined by van der Waals attractive force therebetween. The carbon nanotube structure 12 can be a substantially pure structure of carbon nanotubes, with few impurities. The carbon nanotube structure 12 can be a freestanding structure, that is, the carbon nanotube structure 12 can be supported by itself without a substrate. For example, if at least one point of the carbon nanotube structure 12 is held, the entire carbon nanotube structure 12 can be lifted without being destroyed.

Figure 10:
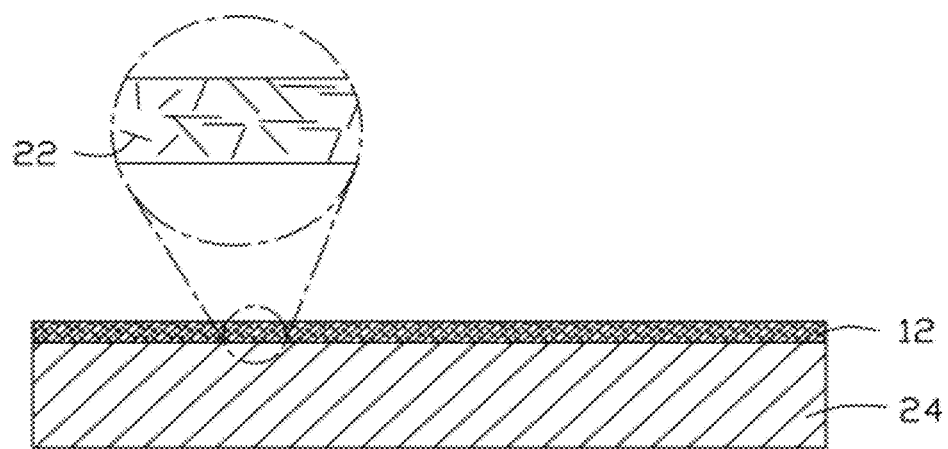
FIG. 10 is a schematic view of a carbon nanotube composite layer used as a contact layer of the pen head of another embodiment.

Referring to FIG. 10, in one embodiment, a carbon nanotube composite layer includes the flexible polymer matrix 24 and the carbon nanotube structure 12. The flexible polymer matrix 24 and the carbon nanotube structure 12 are sheets. The carbon nanotube structure 12 is disposed on a first surface of the flexible polymer matrix 24. The carbon nanotube structure 12 can be at least partly embedded into the flexible polymer matrix 24 through the first surface of the flexible polymer matrix 24.

Figure 11:
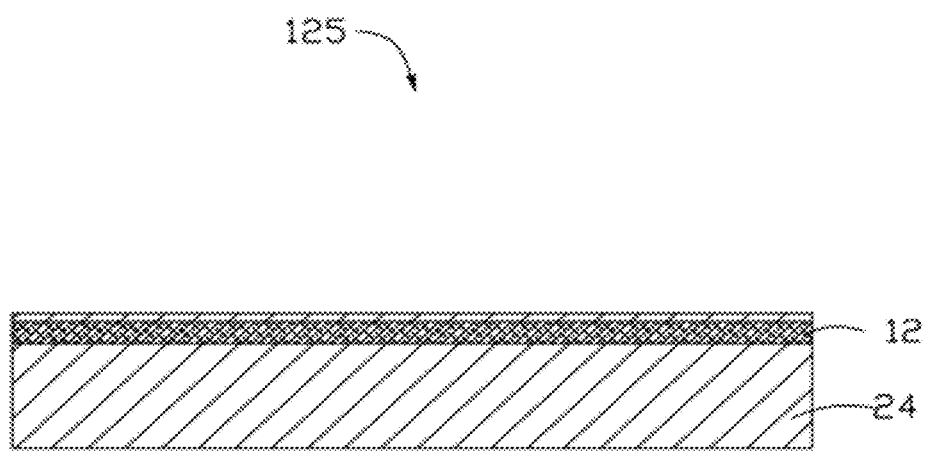
FIG. 11 is a schematic view of a carbon nanotube composite layer used as a contact layer of the pen head of another one embodiment.

Referring to FIG. 11, in one embodiment, the carbon nanotube structure 12 is disposed in the flexible polymer matrix 24. In another embodiment, the carbon nanotube structure 12 is enclosed within in the flexible polymer matrix 24. The flexible polymer matrix 24 is covered on surfaces of the carbon nanotube structure 12. A thickness of the flexible polymer matrix 24 covered on the layered carbon nanotube structure is less than 10 millimeters. Because the thickness is very thin, surfaces of the carbon nanotube composite layer in FIG. 11 is electrically conductive.

Carbon Nanotube Structure

The carbon nanotubes in the carbon nanotube structure 12 can be orderly or disorderly arranged. The term 'disordered carbon nanotube structure' refers to a structure where the carbon nanotubes are arranged along different directions, and the aligning directions of the carbon nanotubes are random. The number of the carbon nanotubes arranged along each different direction can be almost the same (e.g. uniformly disordered). The carbon nanotube structure 12 has properties identical in all directions of the carbon nanotube structure. The carbon nanotubes in the disordered carbon nanotube structure can be entangled with each other.

The carbon nanotube structure 12 including ordered carbon nanotubes is an ordered carbon nanotube structure. The term 'ordered carbon nanotube structure' refers to a structure where the carbon nanotubes are arranged in a consistently systematic manner, e.g., the carbon nanotubes are arranged approximately along a same direction and/or have two or more sections within each of which the carbon nanotubes are arranged approximately along a same direction (different sections can have different directions). The carbon nanotubes in the carbon nanotube structure 12 can be single-walled, double-walled, or multi-walled carbon nanotubes. The carbon nanotube structure 12 can include at least one carbon nanotube film. In other embodiment, the carbon nanotube structure 12 is composed of one carbon nanotube film or at least two carbon nanotube films.

Figure 12:
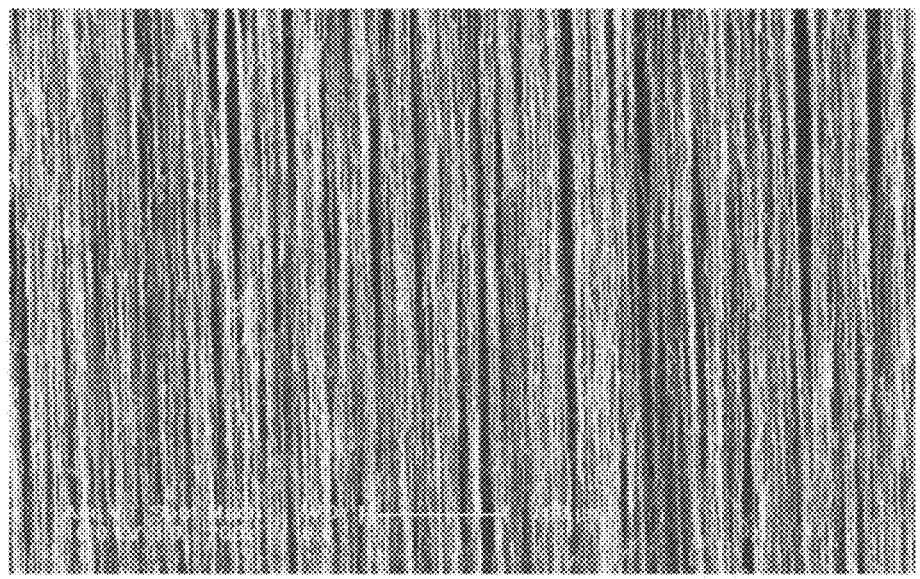
FIG. 12 is a Scanning Electron Microscope (SEM) image of a drawn carbon nanotube film.

In one embodiment, the carbon nanotube film can be a drawn carbon nanotube film. Referring to FIG. 12, the drawn carbon nanotube film includes a plurality of successive and oriented carbon nanotubes joined end-to-end by van der Waals attractive force therebetween. The drawn carbon nanotube film is a freestanding film. Each drawn carbon nanotube film includes a plurality of successively oriented carbon nanotube segments joined end-to-end by van der Waals attractive force therebetween. Each carbon nanotube segment includes a plurality of carbon nanotubes substantially parallel to each other, and joined by van der Waals attractive force therebetween. Some variations can occur in the carbon nanotube film. The carbon nanotubes in the drawn carbon nanotube film are oriented along a preferred orientation. The drawn carbon nanotube film can be treated with an organic solvent to increase the mechanical strength and toughness of the drawn carbon nanotube film and reduce the coefficient of friction of the drawn carbon nanotube film. The thickness of the carbon nanotube film can range from about 0.5 nanometers to about 100 micrometers.

The carbon nanotubes in the drawn carbon nanotube structure can be single-walled, double-walled, and/or multi-walled carbon nanotubes. The diameters of the single-walled carbon nanotubes can range from about 0.5 nanometers to about 50 nanometers. The diameters of the double-walled carbon nanotubes can range from about 1 nanometer to about 50 nanometers. The diameters of the multi-walled carbon nanotubes can range from about 1.5 nanometers to about 50 nanometers. The lengths of the carbon nanotubes can range from about 200 micrometers to about 900 micrometers.

Figure 13:
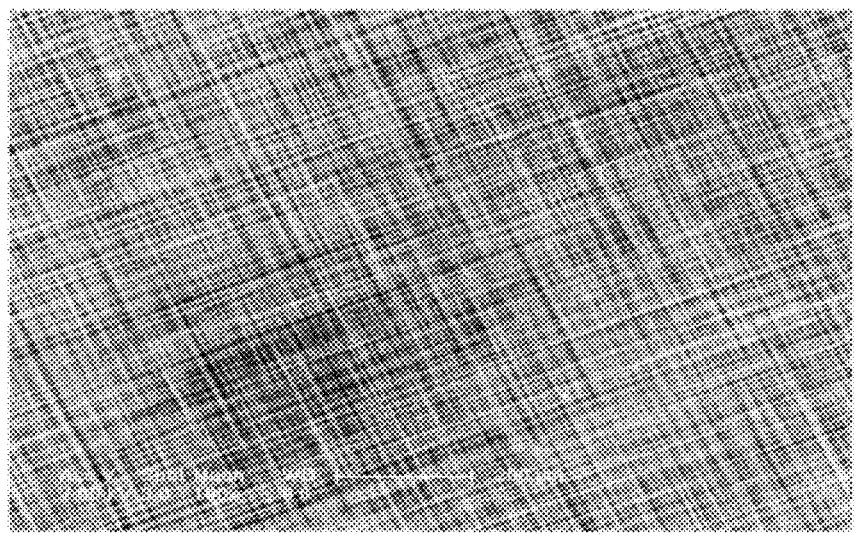
FIG. 13 is an SEM image of a carbon nanotube structure including at least two stacked carbon nanotube films.

The carbon nanotube structure 12 can include at least two stacked drawn carbon nanotube films. The carbon nanotubes in the drawn carbon nanotube film are aligned along one preferred orientation, an angle can exist between the orientations of carbon nanotubes in adjacent drawn carbon nanotube films, whether stacked or adjacent. An angle between the aligned directions of the carbon nanotubes in two adjacent drawn carbon nanotube films can range from about 0 degrees to about 90 degrees, such as the angle can be about 15 degrees, 45 degrees or 60 degrees. Referring to FIG. 13, in one embodiment, the carbon nanotube structure 12 includes four drawn carbon nanotube films stacked with each other, and the angle between the aligned directions of the carbon nanotubes in two adjacent drawn carbon nanotube films is 90 degrees.

Figure 14:
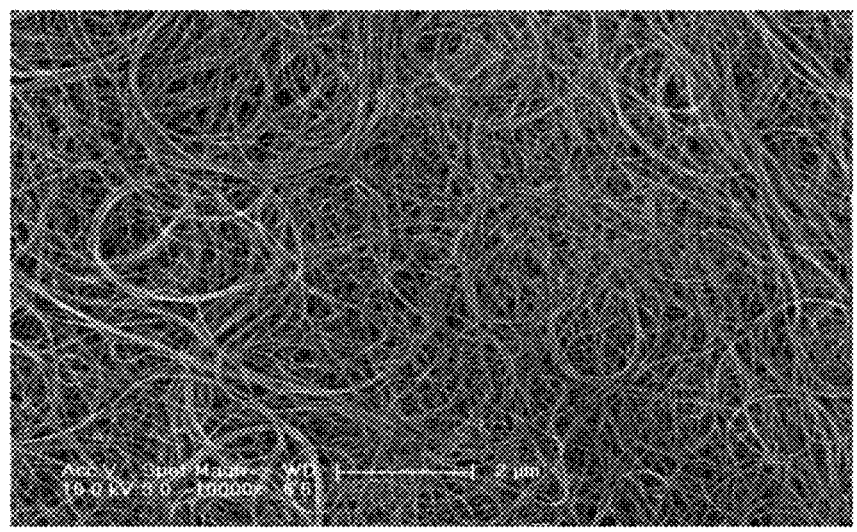
FIG. 14 shows an SEM image of a flocculated carbon nanotube film.

In other embodiments, the carbon nanotube film can be a flocculated carbon nanotube film. Referring to FIG. 14, the flocculated carbon nanotube film can include a plurality of long, curved, disordered carbon nanotubes entangled with each other. Furthermore, the flocculated carbon nanotube film can be isotropic. The carbon nanotubes can be substantially uniformly dispersed in the flocculated carbon nanotube film. Adjacent carbon nanotubes are acted upon by van der Waals attractive force to obtain an entangled structure with micropores defined therein. Because the carbon nanotubes in flocculated carbon nanotube film are entangled with each other, the carbon nanotube structure 12 employing the flocculated carbon nanotube film has excellent durability and flexibility, and can be fashioned into desired shapes with a low risk to the integrity of the carbon nanotube structure. A diameter of the micropores is less than 10 micrometers. The thickness of the flocculated carbon nanotube film can range from about 0.5 nanometers to about 1 micrometer.

Figure 15:
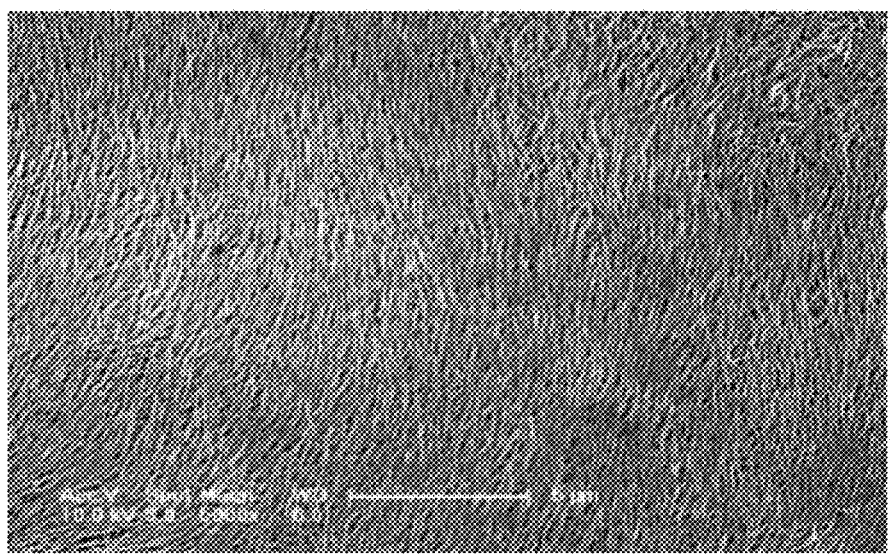
FIG. 15 shows an SEM image of a pressed carbon nanotube film.

Referring to FIG. 15, in some other embodiments, the carbon nanotube film can be a pressed carbon nanotube film. The pressed carbon nanotube film is formed by pressing a carbon nanotube array. The carbon nanotubes in the pressed carbon nanotube film are arranged along a same direction or along different directions. The carbon nanotubes in the pressed carbon nanotube film can rest upon each other. Adjacent carbon nanotubes are attracted to each other and are joined by van der Waals attractive force. An angle between a primary alignment direction of the carbon nanotubes and a surface of the pressed carbon nanotube film is about 0 degrees to about 15 degrees. The greater the pressure applied, the smaller the angle obtained. If the carbon nanotubes in the pressed carbon nanotube film are arranged along different directions, the carbon nanotube structure 12 can be isotropic. The pressed carbon nanotube film has identical properties in all directions substantially parallel to a surface of the carbon nanotube film. A thickness of the pressed carbon nanotube film can range from about 0.5 nanometers to about 1 micrometer.

In one embodiment, the carbon nanotube structure 12 can be a carbon nanotube array that includes a plurality of ordered carbon nanotubes. The carbon nanotubes of the carbon nanotube array are oriented along a same direction and are perpendicular to a substrate which they grow on. A thickness of the carbon nanotube array ranges from about 0.5 nanometers to about 100 microns.

Figure 16:
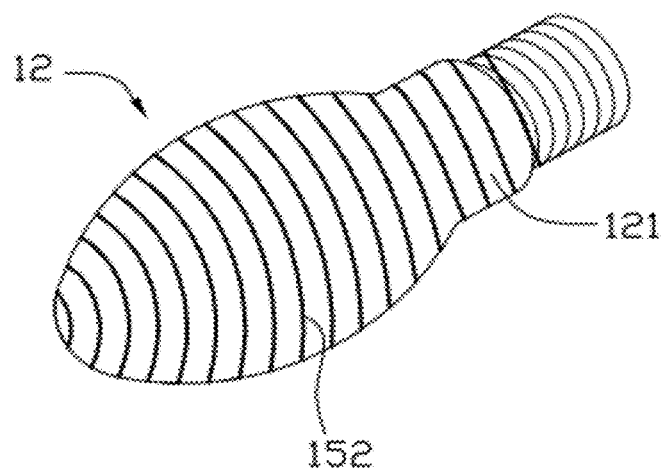
FIG. 16 is a schematic view of a pen head including a carbon nanotube wire structure located on an outer surface of a supporter according to one embodiment.
Figure 17:
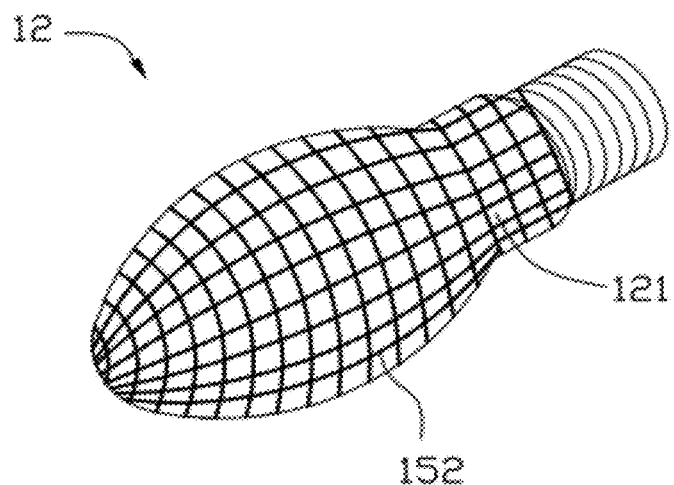
FIG. 17 is a schematic view of a pen head including a plurality of carbon nanotube wire structures located on the outer surface of a supporter according to one embodiment.

Referring to FIG. 16 and FIG. 17, in some embodiments, the carbon nanotube structure 12 can include at least one carbon nanotube wire structure 152 located on the outer surface of the supporter 121. Referring to FIG. 16, in one embodiment, if the carbon nanotube structure 12 is a single carbon nanotube wire structure 152, the carbon nanotube structure 12 can be twisted around the outer surface of the supporter 121. Referring to FIG. 17, in other embodiment, if the carbon nanotube structure 12 includes a plurality of carbon nanotube wire structures 152, the plurality of carbon nanotube wire structures 152 can be crossed with each other or woven with each other to form a net structure. The net structure covers the outer surface of the supporter 121.

The carbon nanotube wire structure 152 includes a plurality of carbon nanotubes joined end to end by van der Waals attractive force therebetween. The carbon nanotube wire structure 152 can be a substantially pure structure of carbon nanotubes, with few impurities. The carbon nanotube wire structure 152 can be a freestanding structure. The carbon nanotubes in the carbon nanotube wire structure 152 can be single-walled, double-walled, or multi-walled carbon nanotubes.

Figure 18:
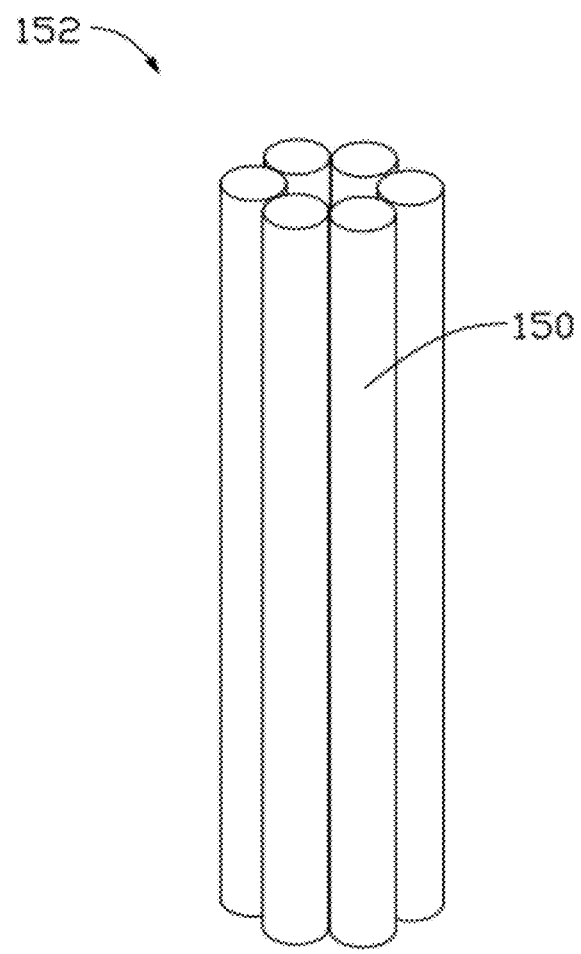
FIG. 18 is a schematic view of a carbon nanotube wire structure including a plurality of carbon nanotube wires parallel with each other in one embodiment.
Figure 19:
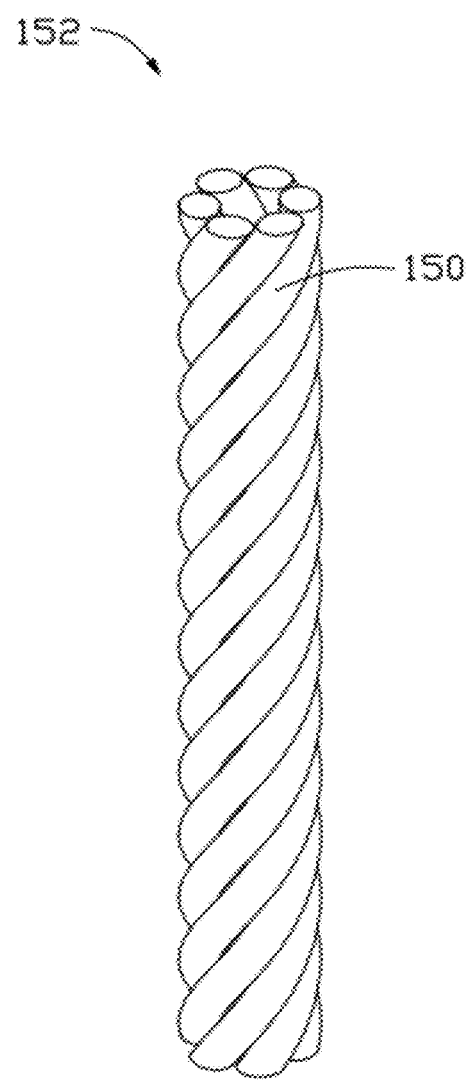
FIG. 19 is a schematic view of a carbon nanotube wire structure including a plurality of carbon nanotube wires twisted with each other in one embodiment.

The carbon nanotube structure 152 includes at least one carbon nanotube wire 150. The carbon nanotube wire 150 includes a plurality of carbon nanotubes. The carbon nanotube wire 150 can be a pure wire structure of carbon nanotubes. The carbon nanotube wire 150 includes a plurality of pores defined by adjacent carbon nanotubes. Size of the pores is less than 10 micrometers. Referring to FIG. 18, the carbon nanotube wire structure 152 can include a plurality of carbon nanotube wires 150 parallel with each other. The plurality of carbon nanotube wires 150 can be fixed together via adhesive. Referring to FIG. 19, in other embodiments, the carbon nanotube wire structure 152 includes a plurality of carbon nanotube wires 150 twisted with each other.

Figure 20:
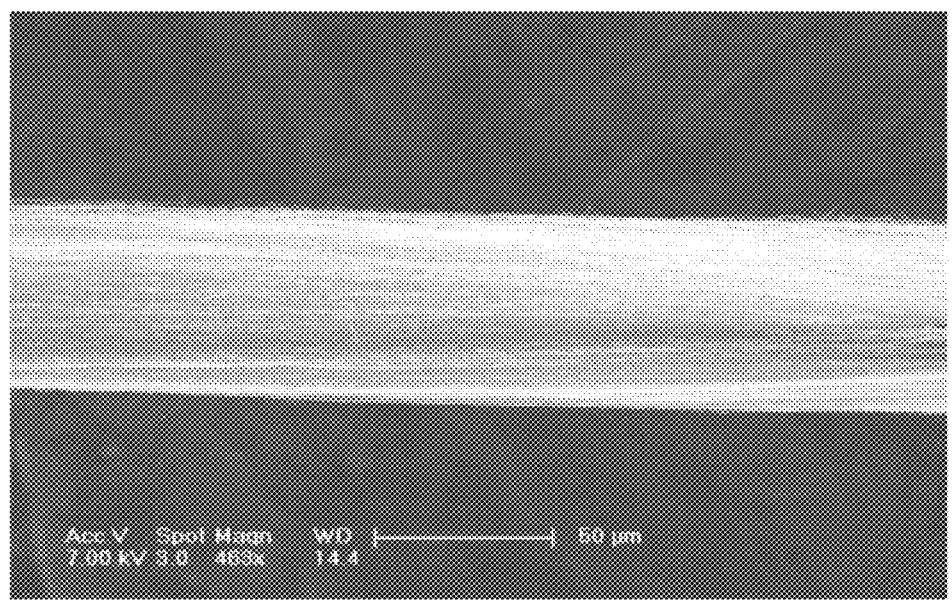
FIG. 20 is an SEM image of an untwisted carbon nanotube wire.

The carbon nanotube wire 150 can be untwisted or twisted. Referring to FIG. 20, the untwisted carbon nanotube wire includes a plurality of carbon nanotubes substantially oriented along a same direction (i.e., a direction along the length direction of the untwisted carbon nanotube wire). The untwisted carbon nanotube wire can be a pure structure of carbon nanotubes. The untwisted carbon nanotube wire can be a freestanding structure. The carbon nanotubes are substantially parallel to the axis of the untwisted carbon nanotube wire. In one embodiment, the untwisted carbon nanotube wire includes a plurality of successive carbon nanotube segments joined end to end by van der Waals attractive force therebetween. Each carbon nanotube segment includes a plurality of carbon nanotubes substantially parallel to each other, and combined by van der Waals attractive force therebetween. The carbon nanotube segments can vary in width, thickness, uniformity and shape. Length of the untwisted carbon nanotube wire can be arbitrarily set as desired. A diameter of the untwisted carbon nanotube wire ranges from about 50 nanometers to about 100 micrometers.

Figure 21:
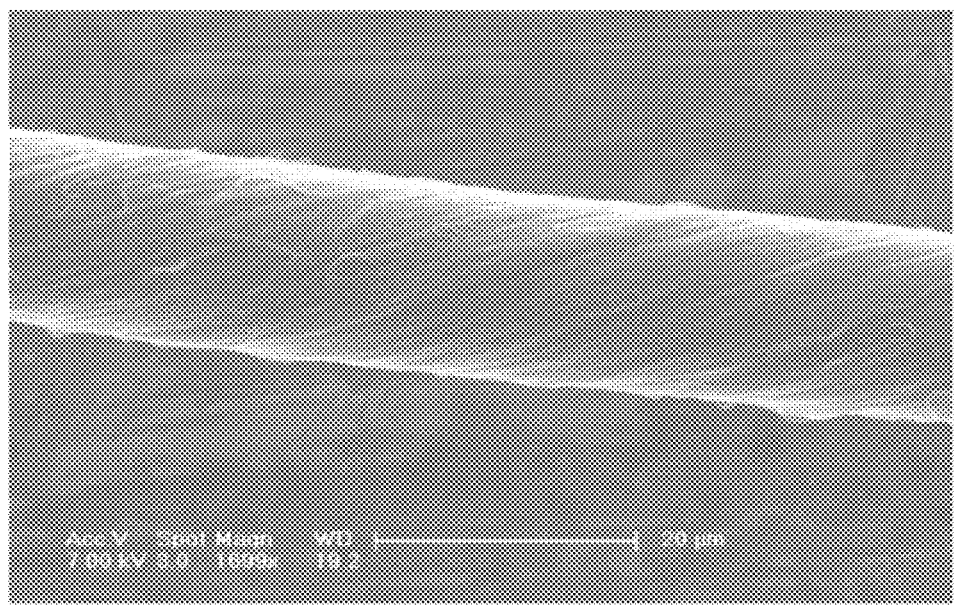
FIG. 21 is an SEM image of a twisted carbon nanotube wire.

Referring to FIG. 21, the twisted carbon nanotube wire includes a plurality of carbon nanotubes helically oriented around an axial direction of the twisted carbon nanotube wire. The twisted carbon nanotube wire can be a pure structure of carbon nanotubes. The twisted carbon nanotube wire can be a freestanding structure. In one embodiment, the twisted carbon nanotube wire includes a plurality of successive carbon nanotube segments joined end to end by van der Waals attractive force therebetween. Each carbon nanotube segment includes a plurality of carbon nanotubes substantially parallel to each other, and combined by van der Waals attractive force therebetween. The length of the carbon nanotube wire can be set as desired. A diameter of the twisted carbon nanotube wire can be from about 50 nanometers to about 100 micrometers. Furthermore, the twisted carbon nanotube wire can be treated with a volatile organic solvent after being twisted. After being soaked by the organic solvent, the adjacent substantially parallel carbon nanotubes in the twisted carbon nanotube wire will bundle together, due to the surface tension of the organic solvent when the organic solvent volatilizes. The density and strength of the twisted carbon nanotube wire will increase.

In one embodiment, the carbon nanotube wire structure 152 includes a plurality of carbon nanotube composite wires. The carbon nanotube composite wire is made by adding polymer material in the pores of the carbon nanotube wire 150. The tensile strengths can be increased after adding the polymer material in the pores of the carbon nanotube wire 150. The polymer material can be polyacrylonitrile, polyvinyl alcohol (PVA), polypropylene (PP), polystyrene (PS), polyvinylchloride (PVC), polyethylene terephthalate (PET), or combinations thereof.

In another embodiment, the carbon nanotube composite wire can also be made by adding metal material in the pores of the carbon nanotube wire 150. The metal material can coat on outer surface of the carbon nanotubes in the carbon nanotube wire 150. The metal material can be copper (Cu), silver (Ag), or combination thereof.

Carbon Nanotube Composite Layer

Figure 22:
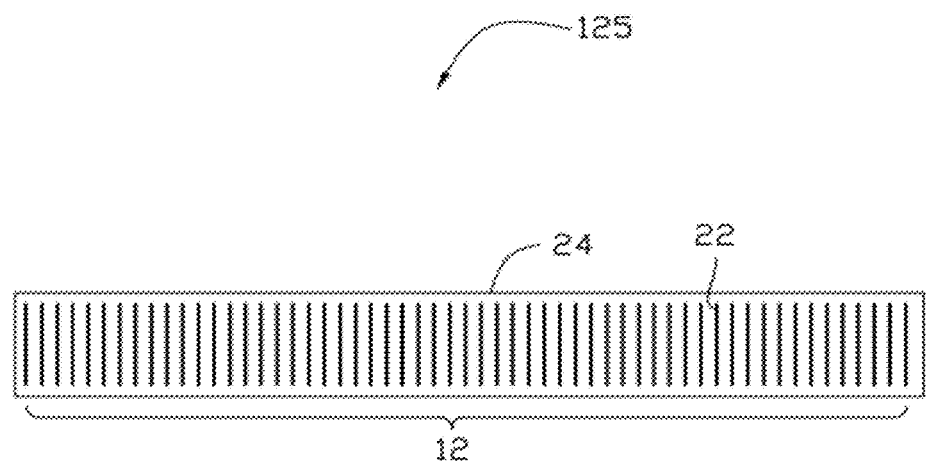
FIG. 22 is a cross-sectional view of a carbon nanotube composite layer in one embodiment.
Figure 23:
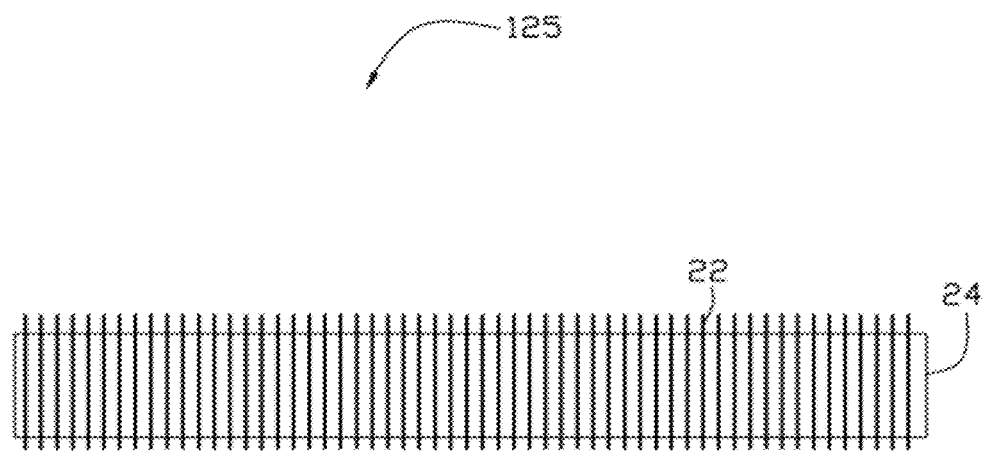
FIG. 23 is a cross-sectional view of a carbon nanotube composite layer in another embodiment.

Referring to FIG. 22, in one embodiment, the carbon nanotube structure 12 is a carbon nanotube array dispersed in the flexible polymer matrix 24 and forms the carbon nanotube composite layer. The carbon nanotube array includes a plurality of carbon nanotubes 22 oriented a long a same direction and parallel with each other. Referring to FIG. 23, in one embodiment, the carbon nanotubes 22 of the carbon nanotube array extrude out of the flexible polymer matrix 24. The parts of the carbon nanotubes 22 extruding out of the flexible polymer matrix 24 are equal to or less than 10 micrometers.

Figure 24:
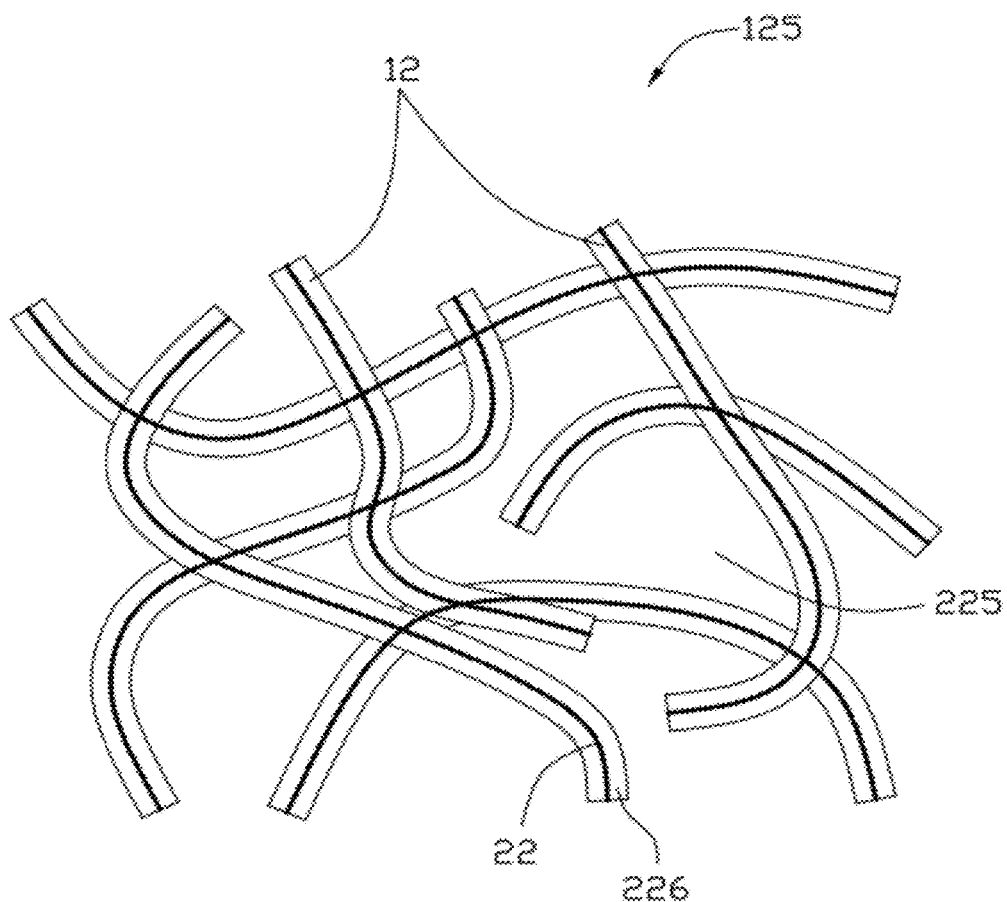
FIG. 24 is a cross-sectional view of a carbon nanotube composite layer in another one embodiment.

Referring to FIG. 24, in one embodiment, the carbon nanotube composite layer made of the contact layer 125 includes a carbon nanotube structure 12 and a conductive material layer 226. The carbon nanotube structure 12 works as a framework. The conductive material layer 226 is coated on the surfaces of the carbon nanotube structure 12. That is, the conductive material layer 226 is supported by the carbon nanotube structure 12.

The carbon nanotube structure 12 includes a plurality of carbon nanotubes 22 and micropores 225. The plurality of carbon nanotubes 22 is assembled together by Van der Waals attractive forces. The micropores 225 are defined between the adjacent carbon nanotubes 22 of the carbon nanotube structure 12. A size of each micropore 225 can be less than 5 micrometers. In one embodiment, the size of each micropore is in a range from about 50 nanometers to about 500 nanometers. A size of the micropore 225 represents the maximum distance between two points on the micropore 225. The carbon nanotube structure 12 includes a plurality of micropores 225.

The conductive material layer 226 is coated on the micropores 225 carbon nanotube structure 12. The conductive material layer 226 wraps around the carbon nanotubes 22 to form a tubular coating layer structure. Here, the individual carbon nanotube 22 and the carbon nanotube structure 12 serve as the core and the template. In one embodiment, the conductive material layer 226 is disposed on the whole surface of the carbon nanotube structure 12, which means that the surface of each carbon nanotube 22 is coated by the conductive material layer 226.

The conductive material layer 226 can be an electrically conductive polymer layer made of a material such as polyaniline, polypyrrole, polythiophene, polyacetylene, polyparaphenylene, poly phenylene vinylene, or any combination thereof. A thickness of the electrically conductive polymer layer is from about 30 nanometers to about 150 nanometers. A weight percentage of the electrically conductive polymer material in the carbon nanotube composite layer is in a range from about 5% to about 80%. In one embodiment, the material of the conductive material layer 226 is polyaniline, and the weight percentage of the conductive material layer 226 in carbon nanotube composite layer is in a range from about 5% to about 20%.

The conductive material layer 226 can also be a metal layer made of metal, such as copper (Cu), silver (Ag), or combination thereof. A thickness of the metal layer electrically conductive polymer layer can be from about 1 nanometer to about 20 nanometers.

In some other embodiments, a middle layer can be located between the carbon nanotubes 22 and the metal layer. The middle layer has good wetting property with the carbon nanotube 22, and can combine tightly with the carbon nanotubes 22. The metal layer is located on an outer surface of the middle layer. A material of the middle layer can be nickel, palladium or titanium. A thickness of the middle layer can be in a range from about 4 nanometers to about 10 nanometers.

The carbon nanotube composite layer has good conductivity and can transmit current fast, as such, if the carbon nanotube composite layer is used as the contact layer 125 of the pen head 120. The touch pen 100 can have a high reaction speed.

Figure 25:
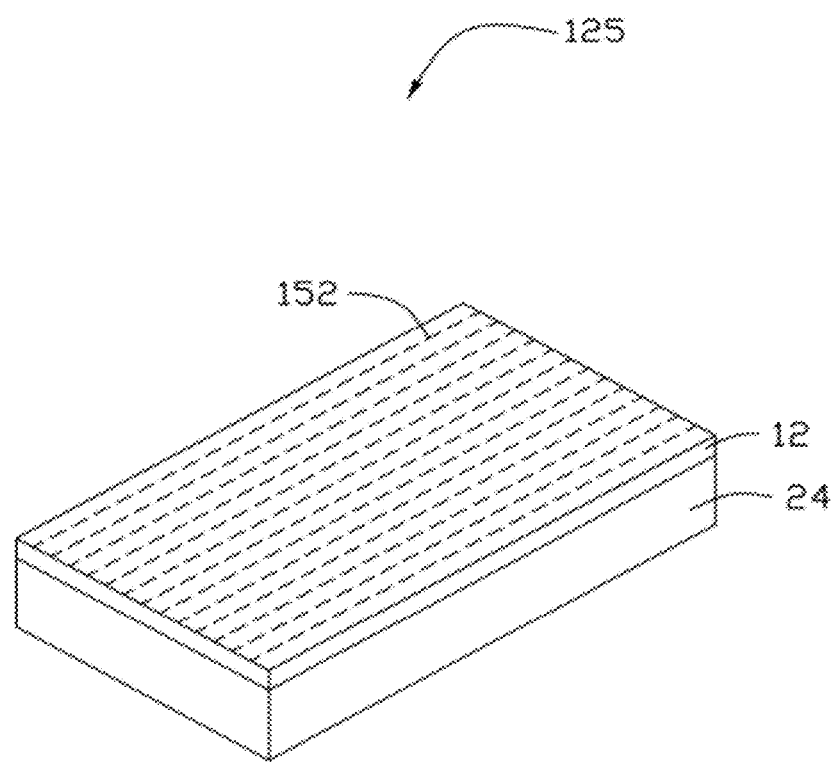
FIG. 25 is a schematic view of a carbon nanotube composite layer used in some embodiments.
Figure 26:
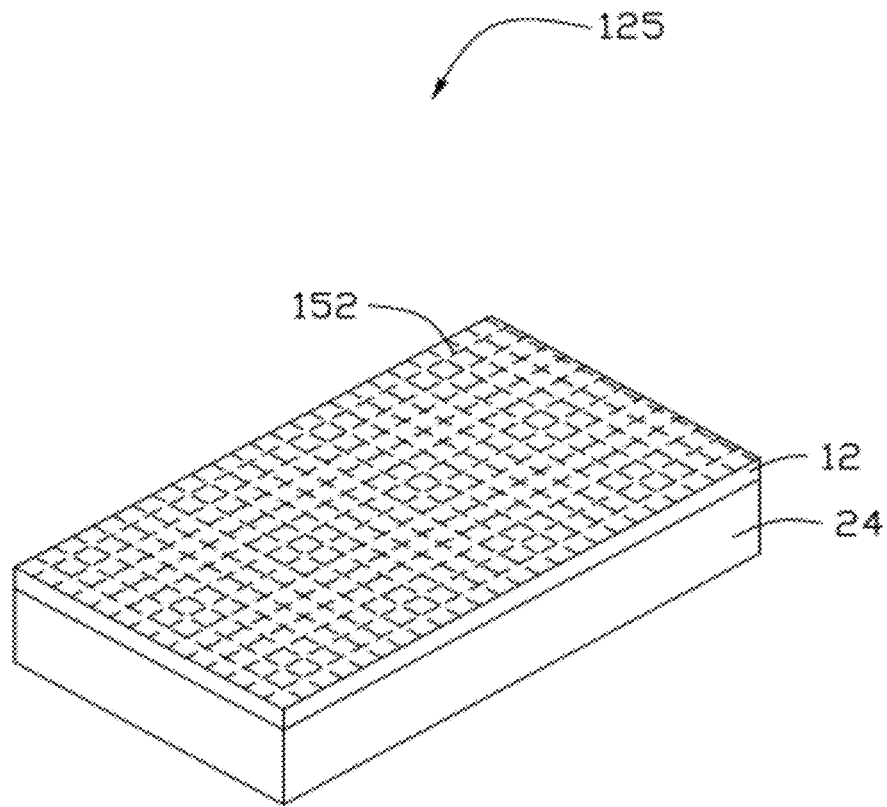
FIG. 26 is a schematic view of a carbon nanotube composite layer used in some other embodiments.

Referring to FIG. 25, in the carbon nanotube composite layer of some embodiments, the carbon nanotube structure 12 includes a plurality of carbon nanotube wire structures 152 disposed on a surface of the flexible polymer matrix 24. The plurality of carbon nanotube wire structures 152 is parallel to each other. Referring to FIG. 26, in some other embodiments, the carbon nanotube structure 12 includes a plurality of carbon nanotube wire structures 152 crossed with each other to form a network, and disposed on a surface of the flexible polymer matrix 24.

Pen Head with Different Shapes for Different Painting Styles

Figure 27:
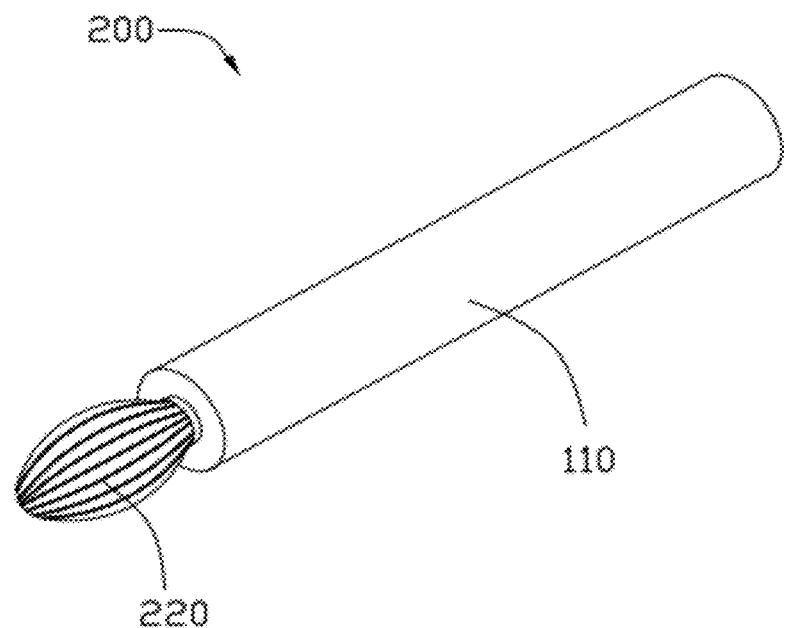
FIG. 27 is a schematic view of a touch pen with a Chinese brush shape pen head in one embodiment.

Referring to FIG. 27, in one embodiment, a touch pen 200 includes a pen body 110 and a Chinese brush-shaped pen head 220. The Chinese brush shaped pen head 220 is fixed on and electrically connected with the pen body 110. The touch pen 200 can be used in painting Chinese painting or writing Chinese traditional handwriting or calligraphy on touch panel in application.

Figure 28:
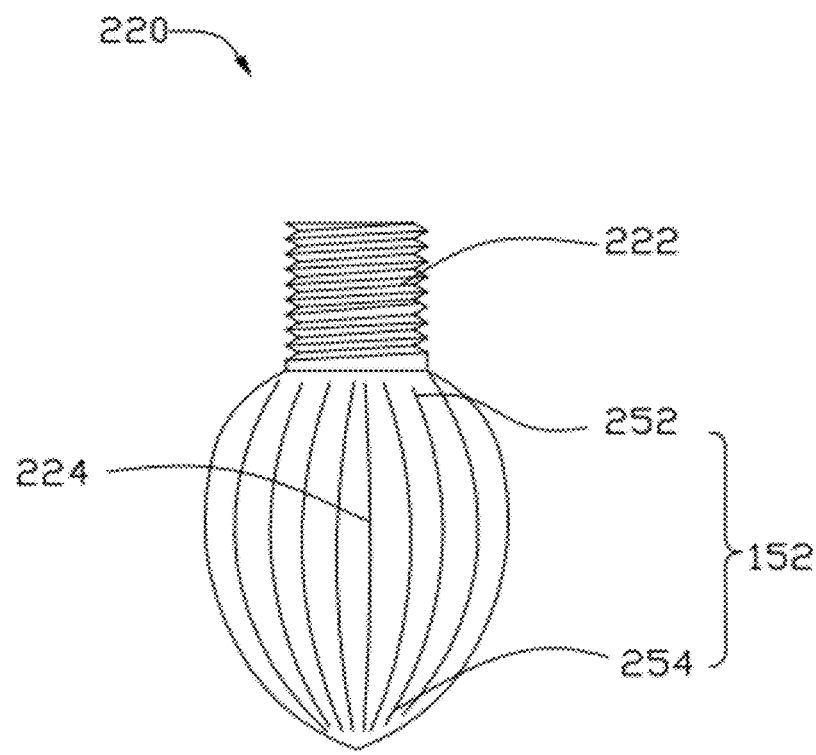
FIG. 28 is a schematic view of the pen head in FIG. 27.

Referring to FIG. 28, in one embodiment, the Chinese brush-shaped pen head 220 includes a plurality of carbon nanotube wire structures 152 assembled with each other. Each of the plurality of carbon nanotube wire structures 152 includes a first end 252 and a second end 254. The first ends 252 are aligned and assembled with each other and fixed to the fixing end 222 of the pen head 220. The fixing end 222 is used to fix the Chinese brush-shaped pen head 220 to the pen body 110. The first ends 252 can be electrically connected with the pen body 110 when the fixing end 222 is fixed on one end of the pen body 110. To ensure the shape of the Chinese brush-shaped pen head 220, the length of the plurality of carbon nanotube wire structures 152 decrease in a direction from the middle axis of the Chinese brush shaped pen head 220 to the outer surface of the Chinese brush shaped pen head 220. The parts between the first end 252 and the second end 254 of the carbon nanotube wire structures 152 can be adhered by a conductive polymer or conductive adhesive.

In another embodiment, the pen head 220 can be made by a hot-pressing method in a Chinese brush shaped die. Carbon nanotubes is put into the Chinese brush shaped die and heated in a predetermined temperature. The carbon nanotubes are stacked and crossed with each other, and joined by Van der Waals attractive force to form a whole structure. A plurality of microspores is defined in the Chinese brush-shaped pen head 220, between the adjacent carbon nanotubes. A diameter of the plurality of microspores is less than 10 micropores. Therefore, the Chinese brush-shaped pen head 220 has good flexibility and large specific surface area. The contact capacitor between the pen head 220 and the touch panel in application can be improved in application. It is understood that the Chinese brush-shaped pen head 220 can be made of the carbon nanotube structure 12 by hot-pressing method in the die.

Figure 29:
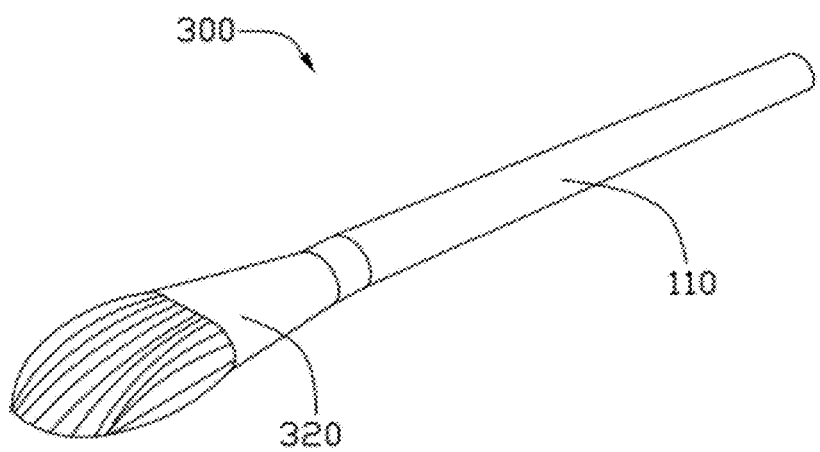
FIG. 29 is a schematic view of a touch pen with a brush-shaped pen head in one embodiment.

Referring to FIG. 29, in one embodiment, a touch pen 300 includes a pen body 110 and an oil brush-shaped pen head 320. The touch pen 300 with the oil brush-shaped pen head 320 can be used in painting oil painting on touch panel in application.

Figure 30:
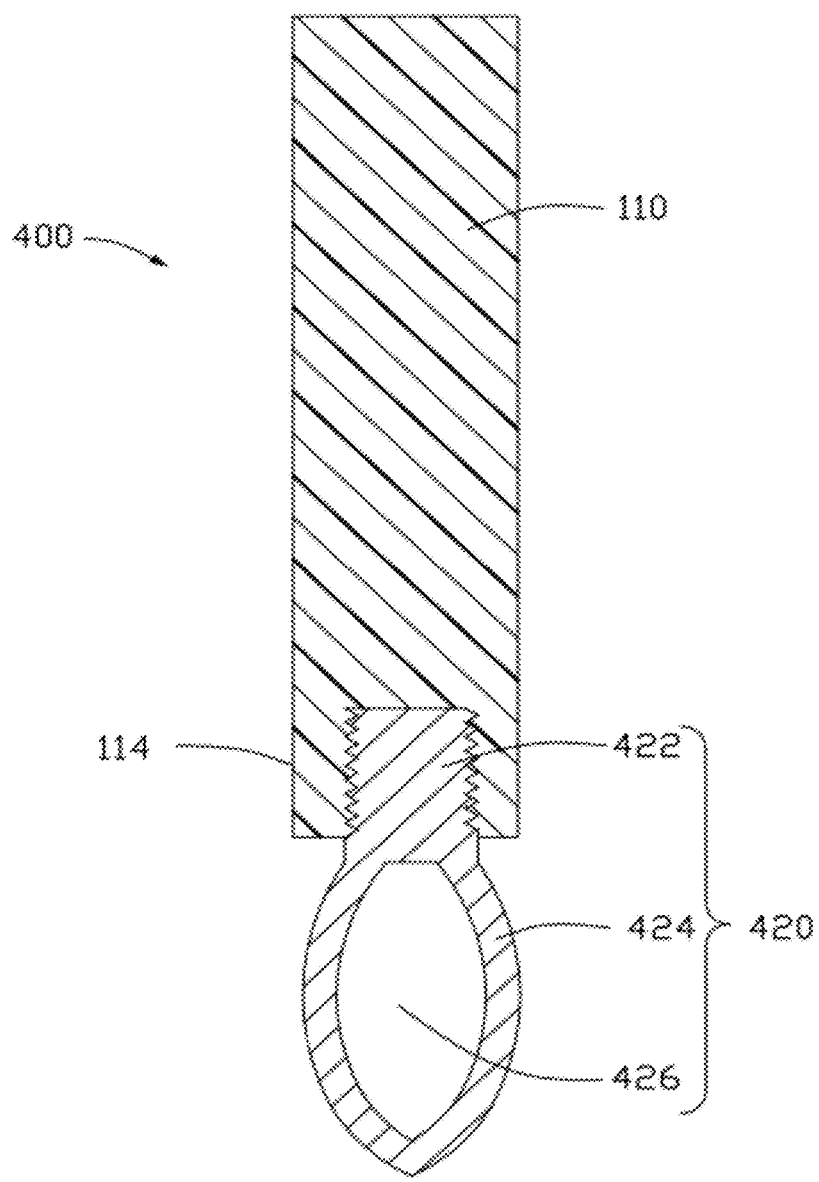
FIG. 30 is a schematic view of a touch pen with a pen head made of the carbon nanotube composite layer in another one embodiment.

Referring to FIG. 30, in one embodiment, a touch pen 400 includes the pen body 110 and a pen head 420. The pen head 420 includes a fixing section 422 and a main section 424. The fixing section 422 is used to fasten the pen head 120 to the fixing end 114 of the pen body 110. A space 426 is defined in the main section 424. The main section 424 has a wall with a thickness in a range from about 0.1 millimeter to about 2 millimeters. The pen head 420 is made of the carbon nanotube composite layer described above. Furthermore, a liquid with high permittivity can be stuffed in the space 426, the capacitor between the main section 424 and the touch panel would increase in application. The liquid with high permittivity can be purified water or formic acid.

It is understood that the liquid with high permittivity can be stuffed in the space 126 of the main section 124 in FIG. 4.

The touch pen disclosed above can be used to operate on a capacitive touch panel screen.

It is to be understood that the described embodiments are intended to illustrate rather than limit the disclosure. Any elements described in accordance with any embodiments is understood that they can be used in addition or substituted in other embodiments. Embodiments can also be used together. Variations may be made to the embodiments without departing from the spirit of the disclosure. The disclosure illustrates but does not restrict the scope of the disclosure.

What is claimed is:

1. A touch pen comprising:
   a body; and
   a head fixed on one end of and electrically connected to the body, wherein the head comprises a supporter and a contact layer comprising graphene layer, the supporter comprises a fixing section and a main section having an outer surface, a groove helically surrounds the outer surface of the main section, the contact layer is located in the groove and extends out from the groove, and the contact layer is a continuous ribbon-shaped layer and helically wraps around the outer surface of the main section.

2. The touch pen as claimed in claim 1, wherein the head is soft and flexible.

3. The touch pen as claimed in claim 1, wherein the supporter comprises a fixing section and a main section, the fixing section is fixed on the one end of the body, and the contact layer is disposed on the main section.

4. The touch pen as claimed in claim 3, wherein the supporter has a hollow structure and defines a space in the main section.

5. The touch pen as claimed in claim 4, wherein the supporter comprises a liquid located in the space.

6. The touch pen as claimed in claim 5, wherein the liquid is purified water or formic acid.

7. The touch pen as claimed in claim 3, wherein the main section comprises a wall with a thickness in a range from about 0.1 millimeters to about 2 millimeters.

8. The touch pen as claimed in claim 1, wherein a material of the supporter is a flexible polymer material selected from the group consisting of silicone elastomer, poly methyl methacrylate, polyurethane, epoxy resin, polypropylene acid ethyl ester, acrylic acid ester, polystyrene, polybutadiene, polyacrylonitrile, polyaniline, polypyrrole, polythiophene and combinations thereof.

* * * * *